(12) United States Patent
Harlan et al.

(10) Patent No.: US 11,203,609 B2
(45) Date of Patent: Dec. 21, 2021

(54) METAL COMPLEXES

(71) Applicant: Univation Technologies, LLC, Houston, TX (US)

(72) Inventors: C. Jeff Harlan, Houston, TX (US); Ching-Tai Lue, Sugarland, TX (US)

(73) Assignee: Univation Technologies, LLC, Houston, TX (US)

( * ) Notice: Subject to any disclaimer, the term of this patent is extended or adjusted under 35 U.S.C. 154(b) by 154 days.

(21) Appl. No.: 16/613,155

(22) PCT Filed: May 16, 2018

(86) PCT No.: PCT/US2018/032893
§ 371 (c)(1),
(2) Date: Nov. 13, 2019

(87) PCT Pub. No.: WO2018/213395
PCT Pub. Date: Nov. 22, 2018

(65) Prior Publication Data
US 2020/0190128 A1 Jun. 18, 2020

Related U.S. Application Data

(60) Provisional application No. 62/507,508, filed on May 17, 2017.

(51) Int. Cl.
| | |
|---|---|
| *C07F 17/00* | (2006.01) |
| *C08F 4/6592* | (2006.01) |
| *C08F 210/16* | (2006.01) |
| *C08F 4/659* | (2006.01) |

(52) U.S. Cl.
CPC ......... *C07F 17/00* (2013.01); *C08F 4/65904* (2013.01); *C08F 4/65925* (2013.01); *C08F 210/16* (2013.01)

(58) Field of Classification Search
CPC ............. C08F 4/65904; C08F 4/65925; C08F 210/16; C07F 17/00
See application file for complete search history.

(56) References Cited

U.S. PATENT DOCUMENTS

| | | |
|---|---|---|
| 2008/0177121 A1 | 7/2008 | Wu et al. |
| 2015/0133614 A1 | 5/2015 | Hussein et al. |
| 2016/0032034 A1 | 2/2016 | Farley et al. |

OTHER PUBLICATIONS

International Search Report & Written Opinion for related PCT Application PCT/US2018/032893, dated Jul. 11, 2018 (11 pgs).
International Preliminary Report on Patentability for related PCT Application PCT/US2018/032893, dated Nov. 28, 2019 (7 pgs).

*Primary Examiner* — Caixia Lu
(74) *Attorney, Agent, or Firm* — Brooks, Cameron & Huebsch, PLLC

(57) ABSTRACT

Embodiments of the present disclosure are directed towards metal complexes that can be utilized to form polymers. As an example, the present disclosure provides a metal complex of Formula I: wherein each Me represents methyl.

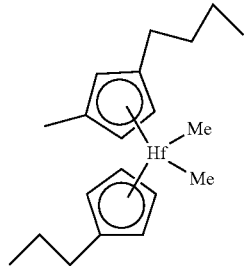

Formula I

4 Claims, No Drawings

METAL COMPLEXES

This application is a National Stage Application under 35 U.S.C. § 371 of International Application Number PCT/US2018/032893, filed May 16, 2018 and published as WO 2018/213395 on Nov. 22, 2018, which claims the benefit to U.S. Provisional Application 62/507,508, filed May 17, 2017, the entire contents of which are incorporated herein by reference in its entirety.

FIELD OF DISCLOSURE

Embodiments of the present disclosure are directed towards metal complexes, more specifically, embodiments are directed towards metal complexes that can be utilized to form polymers.

BACKGROUND

Polymers may be utilized for a number of products including films, among others. Polymers can be formed by reacting one or more types of monomer in a polymerization reaction. There is continued focus in the industry on developing new and improved materials and/or processes that may be utilized to form polymers.

SUMMARY

The present disclosure provides metal complexes of Formula I:

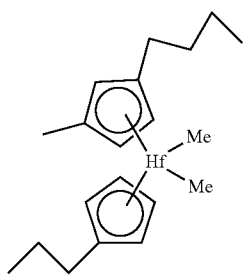

Formula I wherein each Me represents methyl.

The present disclosure provides supported metal complexes including the metal complex of Formula I, bis-(1-ethylindenyl)zirconium dimethyl, and a support materal.

The present disclosure provides methods for forming a polymer including contacting an olefin with a metal complex of Formula I.

The present disclosure provides methods for forming a polymer including contacting an olefin with the supported metal complex.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Metal complexes are disclosed herein. The metal complexes disclosed herein can be represented by Formula I:

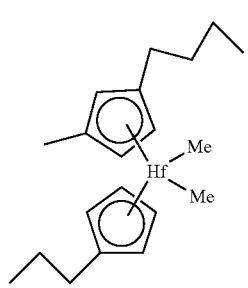

Formula I wherein each Me represents methyl.

The metal complexes disclosed herein may be utilized for polymerizations. Surprisingly, the metal complexes can help to provide polymers having an improved, i.e., reduced, high molecular weight fraction, as compared to polymers formed with other polymerization catalysts. While not wishing to be bound to theory, a reduced high molecular weight fraction may advantageously, among other benefits, help provide reduced formation of gels in films formed from the polymers, as gels appear to be formed predominately from the high molecular weight fraction.

The metal complex of Formula I may be referred to as a metallocene complex. The metal complex of Formula I may be referred to as (n-propylcyclopentadienyl)(1-methyl-3-butylcyclopentadienyl)hafnium dimethyl. The metal complex of Formula I can be formed by processes, i.e. with conventional solvents, reaction conditions, reaction times, and isolation procedures, utilized for forming known metallocenes. As an example, the metal complex of Formula I may be formed by the following synthesis:

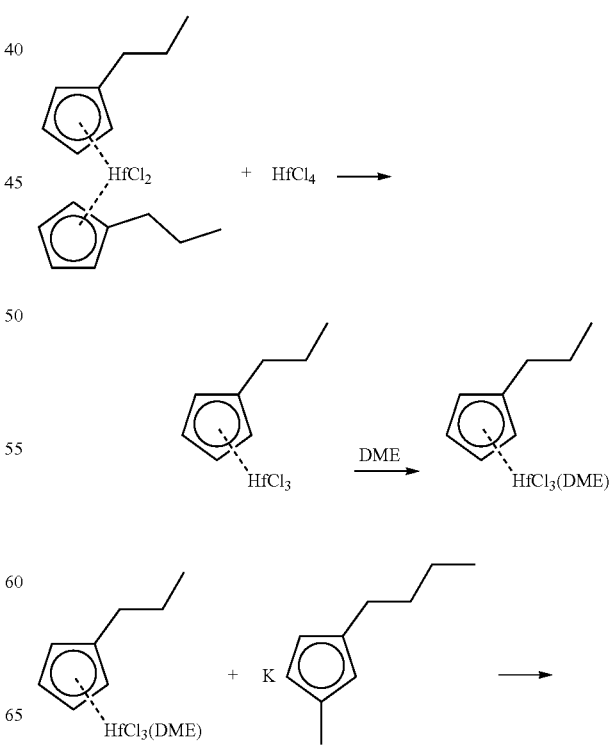

-continued

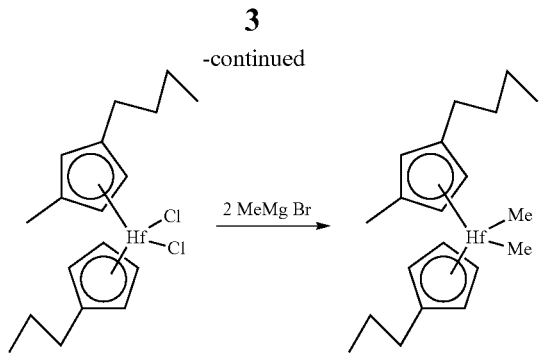

The metal complex of Formula I may be utilized with another complex in forming polymers i.e. another metal complex that is different than the metal complex of Formula I. For instance, the metal complex of Formula I may be utilized with a second metallocene complex.

Metallocene complexes include "half sandwich" and/or "full sandwich" complexes having one or more Cp ligands, i.e.,cyclopentadienyl and ligands isolobal to cyclopentadienyl, bound to at least one Group 3 to Group 12 and lanthanide Group metal atom ("M"), and one or more leaving group bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) may include atoms from the group of Groups 13 to 16 atoms. For instance, atoms that make up the Cp ligands can be from the group of carbon, nitrogen, oxygen, silicon, sulfur, phosphorous, germanium, boron, aluminum, and combinations thereof, where carbon makes up at least 50% of the ring members. In one embodiment, the Cp ligand(s) are from the group of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof, e.g., 4,5,6,7-tetrahydroindenyl, or "H4 Ind", substituted versions thereof, and heterocyclic versions thereof.

The metal atom "M" of the metallocene complex can be selected from Groups 3 through 12 atoms and lanthanide Group atoms; and one embodiment provides "M" is selected from Groups 3 through 10 atoms, e.g., "M" can be selected from Sc, Ti, Zr, Hf, V, Nb, Ta, Mn, Re, Fe, Ru, Os, Co, Rh, Ir, and Ni. M" can be selected from Groups 4, 5, and 6 atoms, e.g., "M" can be selected from Ti, Zr, Hf atoms. The oxidation state of the metal atom "M" can range from 0 to +7. For instance, the oxidation state of "M" can be 0, +1, +2, +3, +4, +5, =6, or +7. The groups bound to the metal atom "M" are are electrically neutral, unless otherwise indicated. The Cp ligand can form at least one chemical bond with the metal atom "M" to form the metallocene complex. The Cp ligands are distinct from the leaving groups bound to the metallocene complex, e.g., they are not highly susceptible to substitution/abstraction reactions.

The metallocene complex can be represented by Formula (II):

$$Cp^A Cp^B MX_n \qquad \text{Formula (II)}$$

where M is as described above; each X is chemically bonded to M; each Cp group is chemically bonded to M; and n is 0 or an integer from 1 to 4. One or more embodiments provide that n is 1 or 2.

The ligands represented by $Cp^A$ and $Cp^B$ in formula (II) can be the same or different cyclopentadienyl ligands or ligands isolobal to cyclopentadienyl, either or both of which can contain heteroatoms and either or both of which can be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $C_P^A$ and $Cp^B$ of formula (II) can be unsubstituted or substituted with any one or combination of substituent groups R. Non-limiting examples of substituent groups R as used in structure (II) include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (II) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, and isopropyl, among others.

As used herein, hydrocarbyl substituents, or groups, are made up of between 1 and 100 carbon atoms, the remainder being hydrogen. Non-limiting examples of hydrocarbyl substituents include linear or branched or cyclic: alkyl radicals; alkenyl radicals; alkynyl radicals; cycloalkyl radicals; aryl radicals; alkylene radicals, or a combination thereof. Non-limiting examples include methyl, ethyl, propyl, butyl, pentyl, hexyl, cyclopentyl, cyclohexyl; olefinically unsaturated substituents including vinyl-terminated ligands, e.g., but-3-enyl, prop-2-enyl, hex-5-enyl and the like, benzyl or phenyl groups, including all their isomers, for example tertiary butyl, and isopropyl, among others.

As used herein, substituted hydrocarbyl substituents, or groups, are made up of between 1 and 100 carbon atoms, the remainder being hydrogen, fluorine, chlorine, bromine, iodine, oxygen, sulfur, nitrogen, phosphorous, boron, silicon, germanium or tin atoms or other atom systems tolerant of olefin polymerization systems. Substituted hydrocarbyl substituents are carbon based radicals. Non-limiting examples of substituted hydrocarbyl substituents trifluoromethyl radical, trimethylsilanemethyl ($Me_3 SiCH_{2-}$) radicals.

As used herein, heteroatom substituents, or groups, are fluorine, chlorine, bromine, iodine, oxygen, sulfur, nitrogen, phosphorous, boron, silicon, germanium or tin based radicals. Heteroatom substituents includes the heteroatom atom by itself. Further, heteroatom substituents include organometalloid radicals. Non-limiting examples of heteroatom substituents include chloro radicals, fluoro radicals, methoxy radicals, diphenyl amino radicals, thioalkyls, thioalkenyls, trimethylsilyl radicals, dimethyl aluminum radicals, alkoxydihydrocarbylsilyl radicals, siloxydiydrocabylsilyl radicals, and tris(perflourophenyl)boron, among others.

Other possible radicals include substituted alkyls and aryls such as, for example, fluoromethyl, fluroethyl, difluoroethyl, iodopropyl, bromohexyl, chlorobenzyl, hydrocarbyl substituted organometalloid radicals including trimethylsilyl, trimethylgermyl, and methyldiethylsilyl, and the like, and halocarbyl-substituted organometalloid radicals, including tris(tdfluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R such as 1-butanyl can form a bonding association to the M.

Each X in the formula (II) and for the formula (III) can independently be selected from the group consisting of: any leaving group, one embodiment includes halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C12$ heteroatom-containing hydrocarbons and substituted derivatives thereof; one embodiment includes hydrides, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls; one embodiment includes hydride, chloride, fluoride, methyl, phenyl, phenoxy, benzoxy, tosyl, fluoromethyls and fluorophenyls; one embodiment includes $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to Cp aryls, substituted $C_7$ to $C_{20}$ alkylaryls, and $C_1$ to $C_{12}$ heteroatom-containing alkyls, $C_1$ to $C_{12}$ heteroatom-containing aryls, and $C_1$ to $C_{12}$ heteroatom-containing alkylaryls; one embodiment includes chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; one embodiment includes fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls); one embodiment.

Other non-limiting examples of X groups include amines, phosphines, ethers, carboxylates, dienes, hydrocarbon radicals having from 1 to 20 carbon atoms, fluorinated hydrocarbon radicals, e.g., —$C_6F_5$(pentafluorophenyl), fluorinated alkylcarboxylates, e.g., $CF_3C(O)O^-$, hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, and dimethylphosphide radicals, among others. In one embodiment, two or more X's form a part of a fused ring or ring system. In one embodiment, X can be a leaving group selected from the group consisting of chloride ions, bromide ions, $C_1$ to $C_{10}$ alkyls, $C_2$ to $C_{12}$ alkenyls, carboxylates, acetylacetonates, and alkoxides.

The another complex can include metallocene complexes of Formula II where $Cp^A$ and $Cp^B$ are bridged to each other by at least one bridging group, (A), such that the structure is represented by the following Formula III:

$Cp^A(A)Cp^BMX_n$

These bridged compounds represented by Formula III may be referred to as "bridged metallocenes." The elements $Cp^A$, $Cp^B$, M, X and n in Formula III are as defined above for Formula II; where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. One embodiment provides that the bridging group (A) can also include substituent groups R, as defined above for Formula (II), including halogen radicals and iron. One embodiment provides that the bridging group (A) can be selected from $C_1$ to $C_6$ alkylenes, substituted Cr to $C_6$ alkylenes, oxygen, sulfur, R'2C═, R'$_2$Si═, ═Si(R')$_2$Si(R'$_2$)═, R'$_2$Ge═, and R'P═, where "═" represents two chemical bonds, is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. One embodiment provides that the bridged metallocene complex of Formula III includes two or more bridging groups (A). In one or more embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene; ethylene; ethylidene; propylidene; isopropylidene; diphenylmethylene; 1,2-dimethylethylene; 1,2-diphenylethylene; 1,1,2,2-tetramethylethylene; dimethylsilyl; diethylsilyl; methyl-ethylsilyl; trifluoromethylbutylsilyl; bis(trifluoromethyl)silyl; di(n-butyl)silyl; di(n-propyl)silyl; di(i-propyl)silyl; di(n-hexyl)silyl; dicyclohexylsilyl; diphenylsilyl; cyclohexylphenylsilyl; t-butylcyclohexylsilyl; di(t-butylphenyl)silyl; di(p-tolypsilyl; and the corresponding moieties where the Si atom is replaced by a Ge or a C atom; as well as dimethylsilyl, di ethylsilyl, dimethylgermyl and diethylgermyl. The bridging group (A) can also include —Si(hydrocarbyl)2-0-(hydrocarbyl)2Si— —Si(substitutedhydrocarbyl)2-0-(substitutedhydrocarbyl)2Si— groups and the like such as —SiMe2-0-SiMe2- and —SiPh2-0-SiPh2-.

The bridging group (A) can also be cyclic, having, for example, 4 to 10 ring members. One embodiment provides that the bridging group (A) can have 5 to 7 ring members. The ring members can be selected from the elements mentioned above, and; in one embodiment provides the ring members can independently be selected from B, C, Si, Ge, N, and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be Cls-, trans-, or a combination thereof.

The cyclic bridging groups (A) can be saturated or unsaturated and/or can carry one or more substituents and/or can be fused to one or more other ring structures. If present, the one or more substituents may be selected from hydrocarbyls, e.g., alkyl, such as methyl, and halogens, e.g., F, Cl. The one or more Cp groups to which the above cyclic bridging moieties can optionally be fused can be saturated or unsaturated, and may be selected from those having 4 to 10, more particularly 5, 6, or 7 ring members, e.g., selected from C, N, O, and S, such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents include hydrocarbyl (particularly alkyl) groups and halogen atoms. The ligands $Cp^A$ and $Cp^B$ of Formula II and III can be different from each other, or the same. The metallocene complex can include bridged mono-ligand metallocene compounds, e.g., mono cyclopentadienyl complex components.

The metallocene complex components discussed above include their structural or optical or enantiomeric isomers (racemic mixture), and, in one embodiment, can be a pure enantiomer. As used herein, a single, bridged, asymmetrically substituted metallocene complex having a racemic and/or meso isomer does not, itself, constitute at least two different bridged, metallocene complex components.

The metallocene complex can include from 0.0.01 wt. % to 4 wt. % of a transition metal based upon a total weight of the metallocene complex. All individual values and subranges from 0.0.01 wt. % to 4 wt. % are included; for example, the metallocene complex can include from a lower limit of 0.0.01 wt. %, 0.2 wt %, 0.3 wt. %, 0.5 wt. %, or 0.7 wt. % to an upper limit of 1.0 wt. %, 2.0 wt. %, 2.5 wt. %, 3.0 wt. %, 3.5 wt. %, or 4.0 wt. % of a transition metal based upon the total weight of the metallocene complex.

The metallocene complex can include any combination of any embodiment discussed and described herein. For example, the metallocene complex can include, but is not limited to, bis(n-propylcyclopentadienyl) hafnium $(CH_3)_2$, bis(n-propylcyclopentadienyl) hafnium $F_2$, bis(n-propylcyclopentadienyl) hafnium $Cl_2$, or bis(n-butyl, methyl cyclopentadienyl) zirconium $Cl_2$, or combinations thereof. Further metallocene complexes and catalysts are discussed in WO 2015/123166. One or more embodiments provide that the metallocene complex is bis-(1-ethylindenyl)zirconium dimethyl. Bis-(1-ethylindenyl)zirconium dimethyl, e.g., a rac- and meso-isomer mixture, can be represented by the following Formulas IV and V:

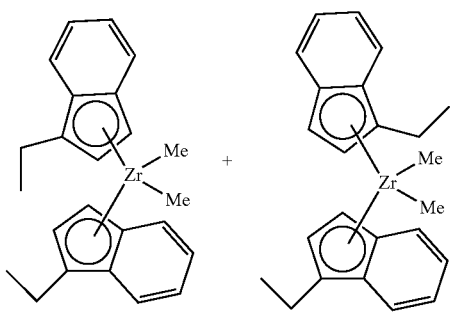

Formulas IV and V where each Me represents methyl.

Embodiments of the present disclosure provide a supported metal complex. The supported metal complex can include the metal complex of Formula I, the metallocene complex, i.e. another complex different than the metal complex of Formula I, and a support material.

The supported metal complex may be formed by a slurry process. The slurry can include components of the supported metal complex, i.e., the metal complex of Formula I, the metallocene catalyst and the support material. The slurry may include one or more activators, support materials, and one more complex and/or catalyst components. For example, the slurry may include an activator, such as alumoxane and/or a modified alumoxane. The slurry can include an activator and/or or a supported activator. In one embodiment, the slurry includes a support material, an activator, and two complexes, e.g., the metal complex of Formula I and the metallocene complex discussed herein. A slurry, e.g., containing silica and alumoxane, may be contacted with a complex, e.g., the metal complex of Formula I, allowed to react, and thereafter the slurry is contacted with another complex, e.g., the metallocene complex. A molar ratio of metal in the activator to metal in a combination of the metal complex of Formula I and the metallocene catalyst may be 1000:1 to 0.5:1, 300:1 to 1:1, or 150:1 to 1:1. Combining a metal complex, i.e. the metal complex of Formula I and/or another metallocene complex with an activator can provide a catalyst, e.g. an activated complex.

The slurry can include a support material which may be any inert particulate carrier material known in the art, including, but not limited to, silica, fumed silica, alumina, clay, talc or other support materials such as disclosed above. In one embodiment, the slurry contains silica and an activator, such as methyl aluminoxane ("MAO"), modified methyl aluminoxane ("MMAO"), as discussed further below.

One or more solvents, diluents and/or carriers can be used to facilitate the combination of any two or more components of the supported metal complex in the slur y or in a trim catalyst solution. For example, toluene or another non-reactive hydrocarbon or hydrocarbon mixture may be utilized. In addition to toluene, other suitable diluents can include, but are not limited to, ethylbenzene, xylene, pentane, hexane, heptane, octane, other hydrocarbons, or combinations thereof.

As used herein, the terms "support material", "support", and "carrier" may be used interchangeably and refer to any support material, including a porous support material, such as talc, inorganic oxides, and inorganic chlorides. The metal complex of Formula I and the metallocene complex can be supported on the same or separate supports together with the activator, or the activator can be used in an unsupported form, or can be deposited on a support different from the metal complex of Formula I and/or the metallocene complex. This may be accomplished by any technique commonly used in the art.

The support material can include one or more inorganic oxides, for example, of Group 2, 3, 4, 5, 13, or 14 elements. The inorganic oxide can include, but is not limited to silica, alumina, titania, zirconia, boria, zinc oxide, magnesia, or combinations thereof. Illustrative combinations of inorganic oxides can include, but are not limited to, alumina-silica, silica-titania, alumina-silica-titania, alumina-zirconia, alumina-titania, and the like. The support material can be or include alumina, silica, or a combination thereof. In one embodiment, the support material is silica.

Suitable commercially available silica supports can include, but are not limited to, ES757, ES70, and ES70W available from PQ Corporation. Suitable commercially available silica-alumina supports can include, but are not limited to, SIRA®1, SIRAL® 5, SIRAL® 10, SIRAL® 20, SIRAL® 28M, SIRAL® 30, and SIRAL® 40, available from SASOL®. Supports comprising silica gels with activators, such as MAOs, can be used in trim systems, since these supports may function better for co-supporting solution carried catalysts. Suitable supports may also be selected from the Cab-o-sil® materials available from Cabot Corporation and silica materials available from the Grace division of W.R. Grace & Company. Supports may also include polymers that are covalently bonded to a ligand on the catalyst. For example, two or more catalyst molecules may be bonded to a single polyolefin chain.

As used herein, the term "activator" refers to any compound or combination of compounds, supported, or unsupported, which can activate a complex or a catalyst component, such as by creating a cationic species of the catalyst component. For example, this can include the abstraction of at least one leaving group (the "X" group described herein) from the metal center of the complex/catalyst component, e.g, the metal complex of Formula I. The activator may also be referred to as a "co-catalyst".

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-($CF_3$)$_2$phenyl)borate, Triphenylcarbenium tetrakis(3,5-($CF_3$)$_2$phenyl)borate, Dimethylanilinium tetrakis(perfluoronapthyl)borate, Tri phenyl carbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl)boron, a tris(perfluoronaphthyl)boron, tris (perfluorophenyl)aluminum, a tris(perfluoronaphthyl) aluminum or any combinations thereof.

The activator may or may not bind directly to the support surface or may be modified to allow them to be hound to a support surface, e.g., via a tethering agent. Such tethering agents may be derived from groups that are reactive with surface hydroxyl species. Non-limiting examples of reactive functional groups that can be used to create tethers include aluminum halides, aluminum hydrides, aluminum alkyls, aluminum aryls, sluminum alkoxides, electrophilic silicon reagents, alkoxy silanes, amino silanes, boranes.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MJVIAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3 A, discussed in U.S. Pat. No. 5,041,584). A source of MAO can be a solution having from about 1 wt. to about a 50 wt, 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaiuminum, tributylaluminum, and combinations thereof.

As mentioned, embodiments of the present disclosure are directed towards metal complexes that can be utilized to form polymers. As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to form a polymer.

Embodiments of the present disclosure provide that the polymer can be a polyolefin. As used herein an "olefin," which may be referred to as an "alkene," refers to a linear, branched, or cyclic compound including carbon and hydrogen and having at least one double bond. As used herein, when a polymer or copolymer is referred to as comprising, e.g., being formed from, an olefin, the olefin present in such polymer or copolymer is the polymerized form of the olefin. For example, when a copolymer is said to have an ethylene content of 75 wt % to 85 wt %, it is understood that the polymer unit in the copolymer is derived from ethylene in the polymerization reaction and the derived units are present at 75 wt % to 85 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase polymerization process. In another embodiment, ethylene and/or propylene can be polymerized with at least two different comonomers, optionally one of which may be a diene, to form a terpolymer.

Embodiments of the present disclosure provide that the polymer can have a density of from 0.890 g/cm$^3$ to 0.970 g/cm$^3$. All individual values and subranges from 0.890 to 0.970 g/cm$^3$ are included; for example, the polymer can have a density from a lower limit of 0.890, 0.900, 0.910, or 0920 g/cm$^3$ to an upper limit of 0.970, 0.960, 0.950, or 0.940 g/cm$^3$. Density can be determined in accordance with ASTM D-792.

Embodiments of the present disclosure provide that the polymer can have a Mn (number average molecular weight) from 5,000 to 75,000. All individual values and subranges from 5,000 to 75,000 are included; for example, the polymer can have a Mn from a lower limit of 5,000; 6,000; 7,000; 7,500; 8,000; or 8,500 to an upper limit of 75,000; 65,000; 55,000; 45,000; 35,000; 25,000; 24,000; 23,000; or 22,000. Mn can be determined by gel permeation chromatography (GPC), as is known in the art.

Embodiments of the present disclosure provide that the polymer can have a Mw (weight average molecular weight) from 60,000 to 110,000. All individual values and subranges from 60,000 to 110,000 are included; for example, the polymer can have a Mw from a lower limit of 60,000; 62,500; 63,000; or 63,500 to an upper limit of 110,000; 109,000; 108,000; or 107,000. Mw can be determined by GPC, as is known in the art.

Embodiments of the present disclosure provide that the polymer can have a Mz (z-average molecular weight) from 150,000 to 400,000. All individual values and subranges from 150,000 to 400,000 are included; for example, the polymer can have a Mz from a lower limit of 150,000; 155,000; 160,000; or 170,000 to an upper limit of 400,000; 375,000; 350,000; or 325,000. Mz can be determined by GPC, as is known in the art.

Embodiments of the present disclosure provide that the polymer can have a molecular weight distribution, determined as Mw/Mn (weight average molecular weight/number average molecular weight) from 3.00 to 8.00. All individual values and subranges from 3.00 to 8.00 are included; for example, the polymer can have a Mw/Mn from a lower limit of 3.00; 3.50; 4.00; or 4.50 to an upper limit of 8.00; 7.50; 7.00; or 6.50. Mw/Mn can be determined by GPC analysis, as is known in the art.

The polymers may be formed by suspension, slurry, and/or gas phase polymerization processes, using known equipment and reaction conditions, i.e. known polymerization conditions. Polymer formation is not limited to any specific type of polymerization system. As an example, polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C.

A number of embodiments of the present disclosure provide that the polymers may be formed via a gas phase polymerization system, at super-atmospheric pressures in the range from 0.07 to 68.9 bar (1 to 1000 psig), from 3.45 to 27.6 bar (50 to 400 psig), or from 6.89 to 24.1 bar (100 to 350 psig), and a temperature in the range from 30° C. to 130° C., from 65° C. to 110° C., from 75° C. to 120° C., or from 80° C. to 120° C. For a number of embodiments, operating temperatures may be less than 112° C. Stirred and/or fluidized bed gas phase polymerization systems may be utilized.

Generally, a conventional gas phase fluidized bed polymerization process can be conducted by passing a stream containing one or more olefin monomers continuously through a fluidized bed reactor under reaction conditions and in the presence of a catalyst composition, e.g., a composition including the metal complex of Formula I and the activator, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalyst composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, catalyst, e.g., the supported metal complex dislcosed herein including the activator, may be continsouly fed to the reactor. A gas that is inert to the catalyst, such as nitrogen or argon, can be used to carry the catalyst into the reactor bed. In another embodiment, the catalyst can be provided as a slurry in mineral oil or liquid hydrocarbon or mixture such, as for example, propane, butane, isopentane, hexane, heptane or octane. The catalyst slurry may be delivered to the reactor with a carrier fluid, such as, for example, nitrogen or argon or a liquid such as for example isopentane or other $C_3$ to $C_8$ alkanes.

For the polymerization process, hydrogen may be utilized at a gas mole ratio of hydrogen to ethylene in the reactor that can be in a range of about 0.0 to 1.0, in a range of 0.01 to 0.7, in a range of 0.03 to 0.5, or in a range of 0.005 to 0.3. A number of embodiments of the present disclosure utilize hydrogen gas.

As mentioned, surprisingly, the metal complexes disclosed herein can help to provide polymers having an improved, i.e., reduced, high molecular weight fraction, as compared to polymers formed with other polymerization catalysts, such as other hafnium metallocenes utilized in combination with a zirconium metallocene for instance.

EXAMPLES

Bis-(1-ethylindenyl)zirconium dimethyl, a metallocene complex, was formed as follows. A nitrogen purged glovebox or standard Schlenk techniques were utilized; anhydrous solvents were obtained from Sigma-Aldrich and were degassed and dried over calcined alumina beads or molecular sieves prior to use. Toluene for the catalyst preparations was pre-dried with alumina beads before use. Deuterated solvents were obtained from Cambridge Isotope Laboratories and were degassed and dried over alumina beads or molecular sieves prior to use. Reagents used were obtained from Sigma-Aldrich, with the exception of $ZrCl_4$ 99+% which was obtained from Strem Chemicals, and bis(n-propyl-cyclopentadienyl)hafnium di methyl ($HfPMe_2$) was obtained from Boulder Scientific.

Freshly distilled indene (50.43 g, 434.1 mmol) was dissolved in pentane (1 L). Ether (25 mL) and then 1.6M n-butyllithium in hexanes (268.5 mL, 429.6 mmol) were added to the clear, stirred solution over a span of 5 min. A white solid precipitated and the supernatant took on a light-yellow color. After stirring overnight, the suspension was filtered then dried to provide indenyllithium.

The indenyllithium (46.51 g, 380.95 mmol) was dissolved in ether (250 mL); a separate solution was made of ethyl-iodide (95.94 g, 615.12 mmol) in ether(400 mL). This ethyliodide solution was cooled to −30° C. and the indenyllithium solution was cooled to about −10° C. using a dry ice/acetone bath. The indenyllithium solution was added to the ethylidode solution via cannula transfer. The solution became a light yellow to yellow color upon addition of the indenyllithium solution. The reaction was allowed to stir overnight and slowly warm to room temperature. After stirring overnight, the container was brought into a glove box and the volume of ether was reduced in vacuo. Once LiI began to precipitate, pentane (300 mL) was added and the white suspension was filtered resulting in a light orange solution. The pentane was evaporated where more LiI precipitated and a light orange oily liquid was obtained. The crude product was distilled under diminished pressure using a rotary vacuum pump to provide 1-ethylindene (including approximately 10 weight percent 3-ethylindene).

The 1-ethylindene (44.27 g, 306.98 mmol) was dissolved in pentane (500 mL) and 3 mL of ether (3 mL); 1.6M n-butyllithium in hexanes (188.28 mL, 301.25 mmol) was added over 10 minutes. Thereafter, a flaky white precipitate formed and the stirring stopped; the mixture was manually stirred to help ensure incorporation of reagents and the suspension was allowed to sit overnight. The suspension was filtered and the white solid dried in vacuo to provide 1-ethyl indenyllithium.

The 1-ethyl indenyllithium (7.00 g, 46.65 mmol) was dissolved in 74 mL of 1,-2-dimethoxyethane (DW); a separate solution was made of $ZrCl_4$ (5.43 g, 23.30 mmol) and DME (75 mL). The 1-ethyl indenyllithium solution was added to the $ZrCl_4$ solution via pipette over a fifteen-minute period. Upon initial addition, the solution took on a yellow color, and after 5 minutes into the addition a precipitate formed and an orange-yellow color ensued. Ten minutes into the addition the supernatant turned orange with a yellow precipitate, and once all the 1-ethyl-indenylltihium solution was added the mixture turned back to yellow. The reaction was allowed to stir overnight; then 3.0 M $CH_3MgBr$ (15.61 mL, 46.83 mmol) in ether was added in 1 mL portions over ten minutes. After the tenth addition, the yellow mixture turned an orangish color. Upon the final addition of the Grignard reagent, the mixture had turned brown and the reaction was allowed to stir overnight. The DME was evaporated and the brown solid was extracted with toluene (3×20 mL) and then washed with pentane (10 mL) and dried in vacuo to provide the bis-(1-ethylindenyl)zirconium dimethyl.

Example 1, metal complexes represented by Formula I:

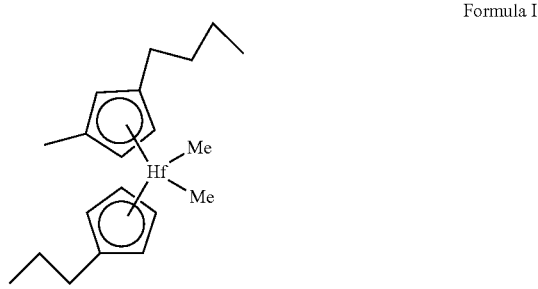

Formula I wherein each Me represents methyl, were formed utilizing conditions similar to those for formation of the bis-(1-ethylindenyl)zirconium dimethyl following synthesis:

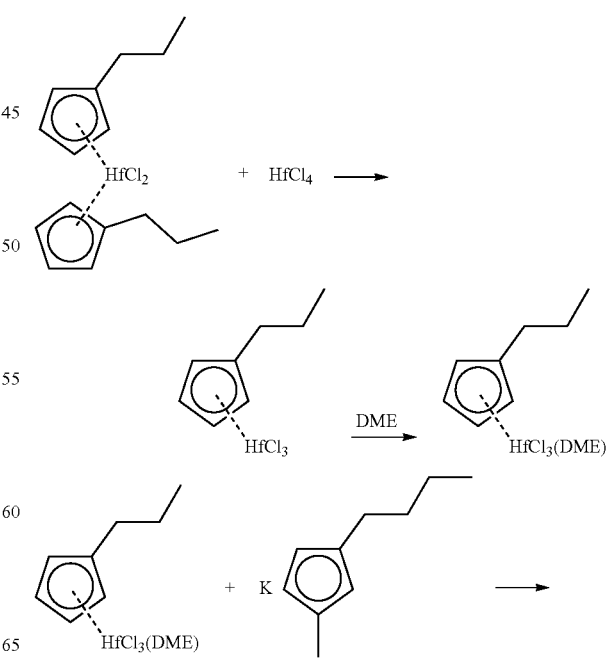

-continued

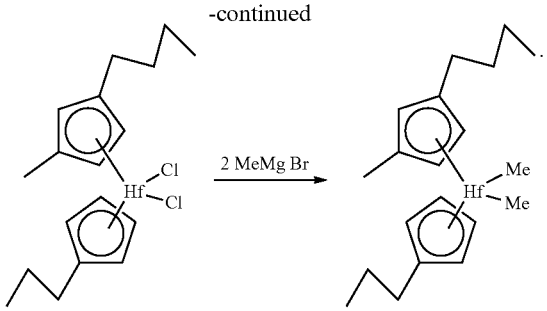

Example 2, an activated supported metal complex, was formed as follows.

Dehydration of silica. Ineos ES757 silica (3969 g) was charged into a dehydrator (6 ft length, 6.25 in diameter) equipped with a 3-zone heater, and then fluidized with thy $N_2$ gas at a flow rate of 0.12 f$^3$/s. Afterwards, the temperature was raised to 200° C. in a 2-hour period. After holding at 200° C. for 2 hours, the temperature was raised to 610° C. in a 6-hour period. After holding at 610° C. for 4 hours, the temperature was allowed to cool to ambient temperature over a 12-hour period. The silica was then stored under $N_2$ pressure (20 psig).

Preparation of Methyl Aluminoxane on Silica. The dehydrated silica (741 g), was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 hours. Afterwards, volatiles were removed by vacuum and heat (40° C.) overnight, then the methyl aluminoxane on silica was allowed to cool to room temperature.

The methyl aluminoxane on silica (3 grams) was added to a 125 ml Cel-Stir mixer in a $N_2$ purged drybox. Pentane (50 mL) was added to create a slurry. The slurry was stirred at ambient temperature. The bis-(1-ethylindenyl)zirconium dimethyl and Example 1 were respectively dissolved in toluene (2 mL and then each were added to the stirring slurry, which was then stirred for one hour. Afterwards, the mixture was filtered onto a glass frit and washed with fresh pentane (2×10 mL) then dried for at least one hour to provide Example 2 (0.50 mol bis-(1-ethylindenyl)zirconium dimethyl:0.50 mol Example 1).

Comparative Example A was formed as Example 2, with the change that bis-(n-propylcyclopentadienyl) hafnium dimethyl was utilized rather than Example 1. Bis-(n-propylcyclopentadienyl) hafnium dimethyl can be represented by the following Formula II:

Formula II

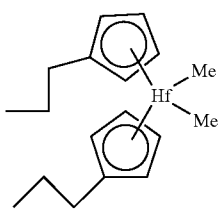

wherein each Me represents methyl. Comparative Example A was 0.50 mol bis-(1-ethylindenyl)zirconium dimethyl: 0.50 mol bis-(n-propylcyclopentadienyl) hafnium dimethyl. Bis-(n-propylcyclopentadienyl) hafnium dichloride is commercially available from TCI, and can readily be converted to bis-(n-propylcyclopentadienyl) hafnium dimethyl by someone skilled in the art by reaction with a methylating agent, such as a Grignard reagent, for example, methylmagnesium bromide.

Example 3 and Comparative Example B, polymerizations, respectively utilizing Example 2 and Comparative Example A, were conducted in a continuous gas phase fluidized bed reactor having a straight section of 24 inch (61 cm) diameter with a length of approximately 11.75 feet (3.6 in) and an expanded section of 10.2 feet (3.1 in) length and 4.2 feet (1.3 m) diameter at the largest width. The fluidized bed was made up of polymer granules, the gaseous feed streams of ethylene and hydrogen together with liquid 1-hexene were mixed together in a mixing tee arrangement and introduced below the reactor bed into the recycle gas line. The individual flow rates of ethylene, hydrogen and 1-hexene were controlled to maintain fixed composition targets. The ethylene concentration was controlled to maintain a constant ethylene partial pressure. Hydrogen was controlled to maintain a constant hydrogen to ethylene mole ratio. The concentrations of all gasses were measured by an on-line gas chromatograph to ensure relatively constant composition in the recycle gas stream. The catalysts, i.e the activated supported metal complexes, were injected directly into the fluidized bed using purified nitrogen as a carrier. The rate of injection was adjusted to maintain a constant production rate of the polymer. The reacting bed of growing polymer particles was maintained in a fluidized state by continually flowing the makeup feed and recycle gas through the reaction zone at a superficial gas velocity 1-3 ft/sec (0.3 to 0.9 m/sec). The reactor was operated at a total pressure of 300 psig (2068 kPa gauge). To maintain a constant reactor temperature of approximately 85° C., the temperature of the recycle gas was continuously adjusted up or down to accommodate any changes in the rate of heat generation due to the polymerization. A solution of antistatic agents in hexane (1:1, Aluminum stearate:N-nonyldiethanolamine at 20 wt %) was fed into the reactor using a mixture of isopentane and nitrogen at a rate to maintain 30 ppm anti-static agents in the fluidized bed. The fluidized bed was maintained at a constant height by withdrawing a portion of the bed at a rate equal to the rate of formation of particulate product. The product was removed semi-continuously via a series of valves into a fixed volume chamber, which was simultaneously vented back to the reactor to allow highly efficient removal of the product, while at the same time recycling a large portion of the unreacted gases back to the reactor, this product was purged to remove entrained hydrocarbons and treated with a small stream of humidified nitrogen to deactivate any trace quantities of residual catalyst. Polymerization conditions are reported in Table 1.

TABLE 1

|  | Catalyst (mg) | H$_2$ Pressure (SCCM) | H$_2$/C$_2$ flow (ppm/mol %) | C$_6$ Pressure (SCCM) | C$_6$/C$_2$ flow (mol/mol) | Yield (g) | Productivity (g/g) | H$_2$/C$_2$ (ppm/mol %) | C$_6$/C$_2$ (mol/mol) |
|---|---|---|---|---|---|---|---|---|---|
| Example 3 Run 1 | 32.4 | 89 | 0.35 | 2 | 0.075 | 88.2 | 2722 | 4.0 | 0.02 |
| Example 3 Run 2 | 30.7 | 89 | 0.35 | 3 | 0.100 | 74.8 | 2436 | 3.0 | 0.03 |
| Example 3 Run 3 | 31.3 | 89 | 0.35 | 4 | 0.150 | 60.2 | 1923 | 3.0 | 0.03 |
| Example 3 Run 4 | 31.7 | 99 | 0.40 | 4 | 0.150 | 62.4 | 1968 | 4.0 | 0.03 |
| Example 3 Run 5 | 32.1 | 99 | 0.40 | 6 | 0.150 | 59.1 | 1841 | 4.0 | 0.04 |
| Comparative Example B Run 1 | 29.3 | 85 | 0.32 | 2 | 0.075 | 76.5 | 2611 | 5.0 | 0.02 |
| Comparative Example B Run 2 | 24.6 | 85 | 0.32 | 3 | 0.100 | 62.9 | 2557 | 4.0 | 0.02 |
| Comparative Example B Run 3 | 29.3 | 85 | 0.32 | 4 | 0.150 | 52.9 | 1812 | 4.0 | 0.03 |
| Comparative Example B Run 4 | 29.2 | 85 | 0.32 | 6 | 0.150 | 64.2 | 2199 | 4.5 | 0.04 |

Mn (number average molecular weight), Mw (weight average molecular weight) and Mz (z-average molecular weight) were determined by gel permeation chromatography (GPC). Molecular weight distribution, determined as Mw/Mn (weight average molecular weight/number average molecular weight) was determined by GPC analysis. The results are reported in Table 2.

TABLE 2

|  | Mn | Mw | Mz | Mw/Mn |
|---|---|---|---|---|
| Example 3 Run 1 | 12,506 | 78,401 | 259,687 | 6.27 |
| Example 3 Run 2 | 11,972 | 76,560 | 260,558 | 6.39 |
| Example 3 Run 3 | 11,554 | 70,676 | 258,165 | 6.12 |
| Example 3 Run 4 | 10,202 | 60,861 | 219,978 | 5.97 |
| Example 3 Run 5 | 9,957 | 52,720 | 181,935 | 5.29 |
| Comparative Example B Run 1 | 10,676 | 102,423 | 406,711 | 9.59 |
| Comparative Example B Run 2 | 10,325 | 102,005 | 409,009 | 9.88 |
| Comparative Example B Run 3 | 9754 | 99,313 | 376,465 | 10.18 |
| Comparative Example B Run 4 | 9562 | 81,422 | 369,879 | 8.52 |

The data of Table 2 illustrates that the polymers formed from each of Runs 1-5 for Example 3 had an improved, i.e., reduced, high molecular weight fraction as compared to each of Runs 1-4 for Comparative Example B. This surprisingly indicates that utilizing the metal complexes of Formula I, as disclosed herein, can advantageously help to provide polymers having a reduced high molecular weight fraction, as compared to polymers formed with other polymerization catalysts.

What is claimed is:

1. A supported catalyst composition comprising:
   a metal complex of Formula I:

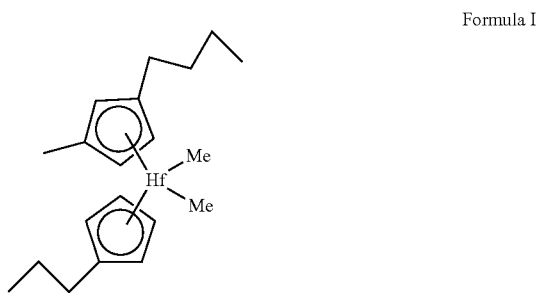

Formula I wherein each Me represents methyl;
a second metallocene complex;
an activator; and
a support material.

2. The supported metal complex of claim 1, wherein the second metallocene complex is bis-(1-ethylindenyl)zirconium dimethyl.

3. A method of forming a polymer, the method comprising:
   contacting, under polymerization conditions, an olefin with the supported catalyst composition of claim 1 to form the polymer.

4. A method of forming a polymer, the method comprising:
   contacting, under polymerization conditions, an olefin with the supported catalyst composition of claim 2 to form the polymer.

* * * * *